(12) United States Patent
Sun et al.

(10) Patent No.: US 11,085,831 B2
(45) Date of Patent: Aug. 10, 2021

(54) HIGH-RESOLUTION REAL-TIME TIME-FREQUENCY DOMAIN MEASURING DEVICE AND METHOD FOR ULTRA-SHORT PULSE

(71) Applicant: Xi'an Institute of Optics and Precision Mechanics of CAS, Shaanxi (CN)

(72) Inventors: Qibing Sun, Shaanxi (CN); Chao Zeng, Shaanxi (CN); Leiran Wang, Shaanxi (CN); Wenfu Zhang, Shaanxi (CN); Wei Zhao, Shaanxi (CN)

(73) Assignee: XI'AN INSTITUTE OF OPTICS AND PRECISION MECHANICS OF CAS, Shaanxi (CN)

( * ) Notice: Subject to any disclaimer, the term of this patent is extended or adjusted under 35 U.S.C. 154(b) by 141 days.

(21) Appl. No.: 16/576,399

(22) Filed: Sep. 19, 2019

(65) Prior Publication Data
US 2020/0378835 A1 Dec. 3, 2020

(30) Foreign Application Priority Data
May 29, 2019 (CN) .......................... 201910458893.7

(51) Int. Cl.
*G01J 11/00* (2006.01)
*H04L 27/26* (2006.01)

(52) U.S. Cl.
CPC .......... *G01J 11/00* (2013.01); *H04L 27/2628* (2013.01)

(58) Field of Classification Search
CPC ...... G01J 11/00; G01J 3/18; G01J 2003/1842; G01J 3/02; G01J 3/00; G01J 3/0256; G02F 1/3501; G02F 1/3534; G02F 1/3544; G02F 1/3551; G02F 1/365; G02F 1/3503; G02F 2202/20; H04L 27/2628; G01M 11/0278; G01N 2021/9511; G01N 2021/9583
USPC ........... 356/432, 445, 239.2, 226, 364, 124, 356/300–334
See application file for complete search history.

(56) References Cited

U.S. PATENT DOCUMENTS

| | | | |
|---|---|---|---|
| 9,273,994 B2 * | 3/2016 | Zheng | G01J 3/42 |
| 2008/0285606 A1 * | 11/2008 | Kippenberg | H04B 10/506 |
| | | | 372/32 |
| 2012/0093519 A1 * | 4/2012 | Lipson | G01J 11/00 |
| | | | 398/157 |
| 2013/0228688 A1 * | 9/2013 | Plusquellic | G01J 3/26 |
| | | | 250/339.06 |
| 2018/0113215 A1 * | 4/2018 | Bennett | G01S 7/4865 |

\* cited by examiner

*Primary Examiner* — Isiaka O Akanbi
(74) *Attorney, Agent, or Firm* — Novick, Kim & Lee, PLLC; Allen Xue

(57) ABSTRACT

A high-resolution real-time time-frequency domain measuring device includes a light splitting unit used to split signal light to be measured, a time lens unit used to perform time domain amplification on the signal light to be measured, a dispersion Fourier transform unit used to perform Fourier transform on the signal light to be measured, and a detection unit used to receive and detect measured data. The time lens and the dispersion Fourier transform technology are used to realize the real-time measurement of sub-picosecond transient characteristics of the ultra-short pulse to accurately obtain the time-frequency domain information of the ultra-short pulse.

9 Claims, 4 Drawing Sheets

HIGH-RESOLUTION REAL-TIME TIME-FREQUENCY DOMAIN MEASURING DEVICE AND METHOD FOR ULTRA-SHORT PULSE

FIELD

The present disclosure belongs to the field of optical measurement, and relates to a high-resolution real-time time-frequency domain measuring device and method, and more particularly relates to a high-resolution real-time time-frequency domain measuring device and method for an ultra-short pulse based on a time lens and dispersion Fourier transform.

BACKGROUND

Thanks to the advantages of short duration, high peak power, large bandwidth and the like, ultra-short pulse laser is an effective measure for people to observe and research ultrafast phenomena, and is widely applied in many fields such as strong field physics, information science, materials science and biomedicine. The rapid development of the ultra-short pulse laser has brought a huge positive impact on related scientific researches. For example, at least two Nobel Prizes have been related to the research on the ultrafast laser field so far: American chemists, Ahmed Zewail et al., used femtosecond lasers to study the transition states of molecules in chemical reaction, and had thus won the 1999 Nobel Prize in Chemistry; an American physicist, John Hall, and a German physicist, Theodor Hansch, had won the 2005 Nobel Prize in Physics for "the contributions of the development of laser-based precision spectroscopy including an optical frequency comb technology". Since the generation of ultra-short laser pulses, the ultra-short laser pulses have been narrower and narrower in pulse width (from picosecond to femtosecond and even attosecond) and higher and higher in peak power (terawatt and even petawatt) over decades, which puts forward increasingly high requirements for accurate measurement of time-frequency domain characteristics of the ultra-short pulses, and it is hard for an existing photoelectric detection and spectral analysis technology to detect time-frequency domain information of the ultra-short pulses in real time. Therefore, how to realize high-resolution real-time measurement of time-frequency domain information of an ultra-short pulse and improve the accuracy and reliability of a measurement result to meet measurement and analysis requirements in an ultrafast process becomes a hot and difficult problem urgently needing to be solved in the field of ultrafast optics and applications.

SUMMARY

In order to solve the problem that an existing photoelectric detection and spectral analysis technology has a difficulty in detecting time-frequency domain information in real time and realizing high-resolution real-time measurement of time-frequency domains of an ultra-short pulse, the present disclosure provides a high-resolution real-time time-frequency domain measuring device and method for an ultra-short pulse based on a time lens and dispersion Fourier transform. The technology for measuring the time-frequency domains of the ultra-short pulse by using the time lens and the dispersion Fourier transform effectively realizes the high-resolution real-time measurement of the time-frequency domains of the ultra-short pulse. The method is simple in principle, and the device is compact in structure and convenient to debug.

The technical solution of the present disclosure is to provide a high-resolution real-time time-frequency domain measuring device for an ultra-short pulse based on a time lens and dispersion Fourier transform, including a light splitting unit, a time lens unit, a dispersion Fourier transform unit and a detection unit.

The light splitting unit is used to split signal light to be measured into two beams: one serving as signal light for the time lens unit and the other one serving as signal light for the dispersion Fourier transform unit.

The time lens unit is used to perform time domain amplification on the received signal light to be measured, and may realize high-fidelity high-multiplying-power time domain amplification of the ultra-short pulse. The dispersion Fourier transform unit is used to perform Fourier transform on the received signal light to be measured, and may realize frequency domain to time domain conversion of the signal light.

The detection unit is used to receive and record time domain information of the signal light to be measured processed by the time lens unit and frequency domain information of the signal light to be measured processed by the dispersion Fourier transform unit.

Further, the time lens unit includes a beam combiner, a signal light path and a pump light path which are respectively located in two incident light paths of the beam combiner, and an idler light path located in an emergent light path of the beam combiner.

The signal light path includes a first attenuator, a first polarization controller and a first dispersion medium which are arranged along the signal light path. The pump light path includes a pump source, a second polarization controller and a second dispersion medium which are arranged along the pump light path.

The idler light path includes a high-nonlinearity low-flattened-dispersion silicon-based micro-nano waveguide, a filter and a third dispersion medium which are arranged in sequence along the idler light path.

The first attenuator is used to adjust the intensity of the signal light. The first polarization controller is used to adjust the polarization of the signal light. The first dispersion medium is used to perform secondary phase modulation on the frequency domain of the signal light.

The pump source is used to provide pump light for a four-wave mixing process. The second polarization controller is used to adjust the polarization of the pump light. The second dispersion medium is used to perform the secondary phase modulation on the frequency domain of the pump light.

The beam combiner is used to combine the signal light with the pump light.

The high-nonlinearity low-flattened-dispersion silicon-based micro-nano waveguide is used to generate a four-wave mixing effect.

The filter is used to filter out the pump light and the signal light to obtain idler light. The third dispersion medium is used to perform the secondary phase modulation on the frequency domain of the idler light.

Further, in order to ensure that the signal light and the pump light enter the beam combiner at the same time, the time lens unit further includes a time delay line located in the signal light path or the pump light path, and the time delay line is used to adjust relative time delay between the signal light and the pump light.

Further, in order to realize the frequency domain to time domain conversion of the signal light, and measure the frequency domain information of the signal light in real time by using an oscilloscope, the dispersion Fourier transform unit includes a second attenuator and a fourth dispersion medium. The second attenuator is used to adjust the intensity of the signal light entering the dispersion Fourier transform unit, and the fourth dispersion medium is used to perform Fourier transform on the signal light.

Further, the detection unit includes a real-time oscilloscope and two photodetectors. The input ends of the two photodetectors are respectively connected with the output ends of the dispersion Fourier transform unit and the time lens unit, and the output ends of the two photodetectors are connected with the real-time oscilloscope.

Further, in order to measure and record the time-frequency domain information of the ultra-short pulse in real time, the photodetectors are photodetectors with a GHz bandwidth; the real-time oscilloscope is a real-time oscilloscope with a GHz bandwidth; and the light splitting unit is a light splitter.

Further, the first dispersion medium, the second dispersion medium and the third dispersion medium are those dispersion-flattened dispersion mediums having group velocity dispersion, such as a single mode fiber or a dispersion compensation fiber, and all dispersion media have different sizes. The fourth dispersion medium is a dispersion-flattened dispersion medium having sufficiently large group velocity dispersion, such as a dispersion compensation fiber and a chirped Bragg grating.

Further, when the signal light is relatively weak, the dispersion Fourier transform unit further includes the Raman pump source used to amplify the signal, and the wavelength division multiplexer.

The present disclosure further provides a method for realizing high-resolution real-time time-frequency domain measurement of an ultra-short pulse based on the above device, including the following steps:

Step I, splitting signal light to be measured into two beams by a light splitter of a light splitting unit: one serving as signal light for a time lens unit and the other one serving as signal light for a dispersion Fourier transform unit;

Step II, performing time domain amplification on the signal light incident to the time lens unit by using the time lens unit;

Step III, performing frequency domain to time domain conversion on the signal light incident to the dispersion Fourier transform unit by using the dispersion Fourier transform unit; and Step IV, receiving and recording frequency domain information of the signal light to be measured processed by the dispersion Fourier transform unit and time domain information of the signal light to be measured processed by the time lens unit by using a detection unit, so as to realize the high-resolution real-time measurement of the time-frequency domains of the ultra-short pulse.

Further, Step II specifically includes:
controlling a pump source to emit pump light; adjusting the power of the signal light by using a first attenuator; adjusting the polarization directions of the signal light and the pump light by using a first polarization controller and a second polarization controller respectively; adjusting relative time delay between the pump light and the signal light by using a time delay line; performing secondary phase modulation on the frequency domains of the signal light and the pump light by using a first dispersion medium and a second dispersion medium respectively; combining the signal light and the pump light after the secondary phase modulation by using a beam combiner, then injecting the combined light into a high-nonlinearity low-flattened-dispersion silicon-based micro-nano waveguide to generate a high-efficiency low-threshold four-wave mixing effect, filtering the combined light by a filter, then outputting idler light, and performing the secondary phase modulation on the frequency domain of the idler light by using a third dispersion medium, so as to realize high-fidelity high-multiplying-power time domain amplification of the signal light.

Further, Step III specifically includes: adjusting the power of the signal light by using a second attenuator; and realizing the frequency domain to time domain conversion of the signal light by using dispersion Fourier transform in a fourth dispersion medium.

The present disclosure has the advantages as follows.

1. The present disclosure uses the time lens and the dispersion Fourier transform technology to realize the real-time measurement of sub-picosecond transient characteristics of the ultra-short pulse to accurately obtain the time-frequency domain information of the ultra-short pulse, thereby breaking through the capacity limitation to the bandwidth of a traditional oscilloscope, the measuring speed of a spectrometer and the like, and the present disclosure is suitable for femtosecond-grade ultra-short pulses.

2. The present disclosure realizes simultaneous high-resolution real-time measurement of the time domain and the frequency domain, with a time resolution less than or equal to 100 fs and a spectral resolution less than or equal to 0.1 nm, and the time-frequency domain information of the ultra-short pulse can be accurately measured in real time.

3. The measuring device of the present disclosure is high in detection sensitivity less than or equal to 0.1 nJ, which greatly improves the sensitivity of the real-time measurement of the time-frequency domains of the ultra-short pulse.

4. Through the real-time measurement of the present disclosure, real-time time domain measurement of the ultra-short pulse, with a time resolution less than or equal to 100 fs, and real-time frequency domain measurement with a spectral capture rate in the megahertz magnitude can be realized.

5. The measuring device of the present disclosure is simple in structure, convenient, practical, low in SWaP (size, weight and power consumption) and low in cost, and has the characteristics of high resolution, instantaneity and the like.

Figure 1:
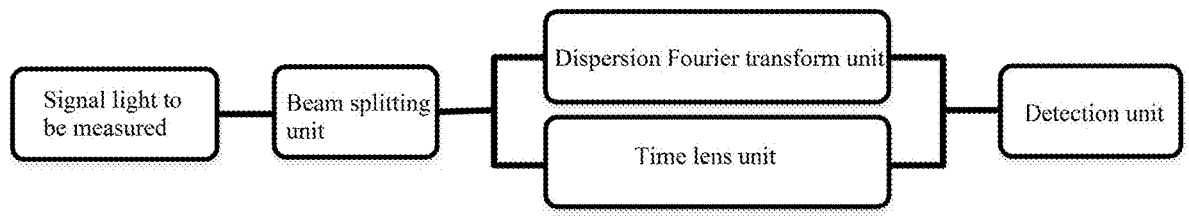
FIG. 1 is a schematic frame diagram of the present disclosure.

Numerals in the drawings: 1: signal light to be measured; 2: light splitter; 3: dispersion Fourier transform unit; 4: time lens unit; 5: detection unit;

31: second attenuator; 32: fourth dispersion medium; 33: Raman pump source; 34: wavelength division multiplexer;

41: first attenuator; 42: time delay line; 43: first polarization controller; 44: second polarization controller; 45: first dispersion medium; 46: second dispersion medium; 47:

beam combiner; 48: silicon-based micro-nano waveguide; 49: filter; 50: third dispersion medium; 51: pump source; 52: first photodetector; 53: second photodetector; 54: real-time oscilloscope.

Detailed Description of the Embodiments

The present disclosure is further described below in combination with accompanying drawings and specific embodiments.

Embodiment I

Figure 2:
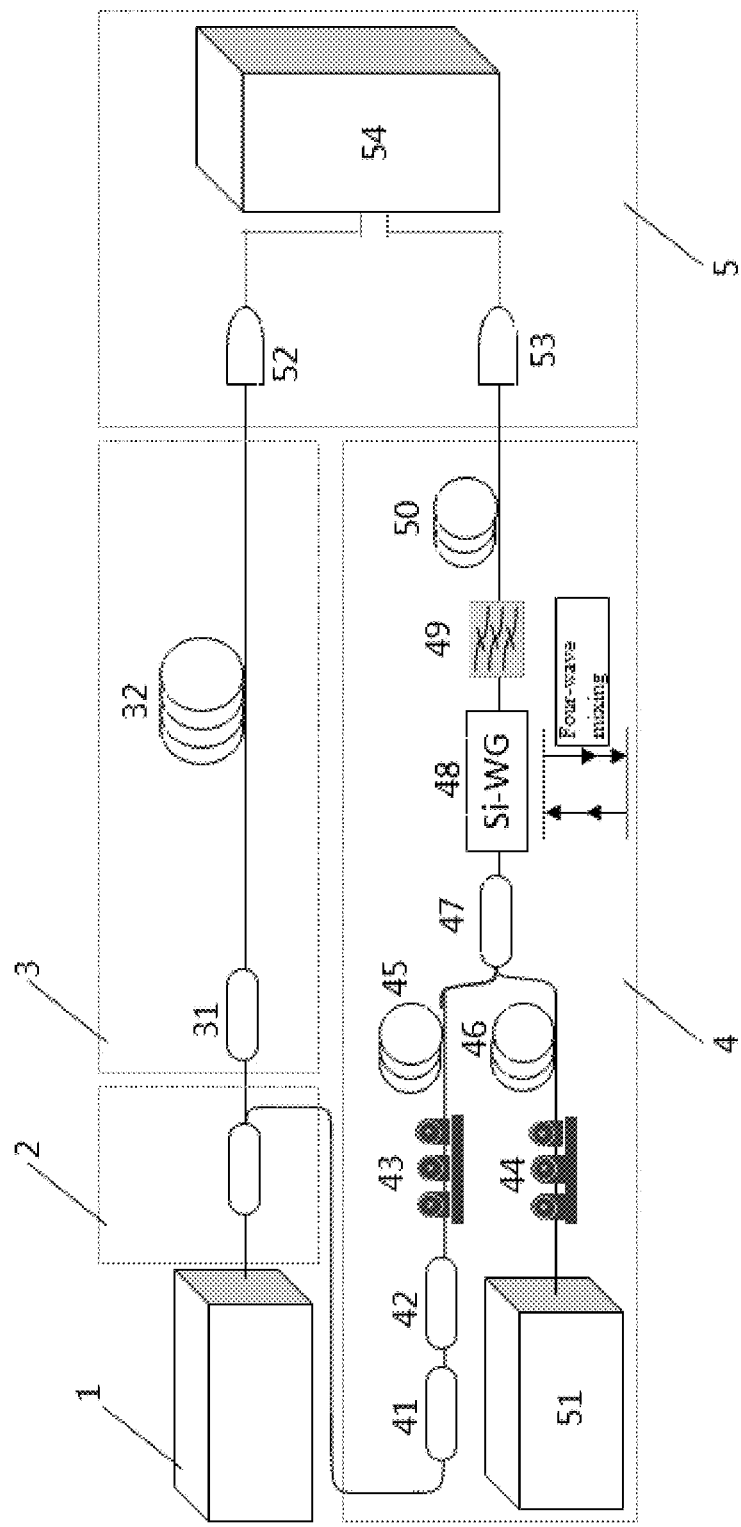
FIG. 2 is a structural schematic diagram of a device according to an embodiment I of the present disclosure.
Figure 3:
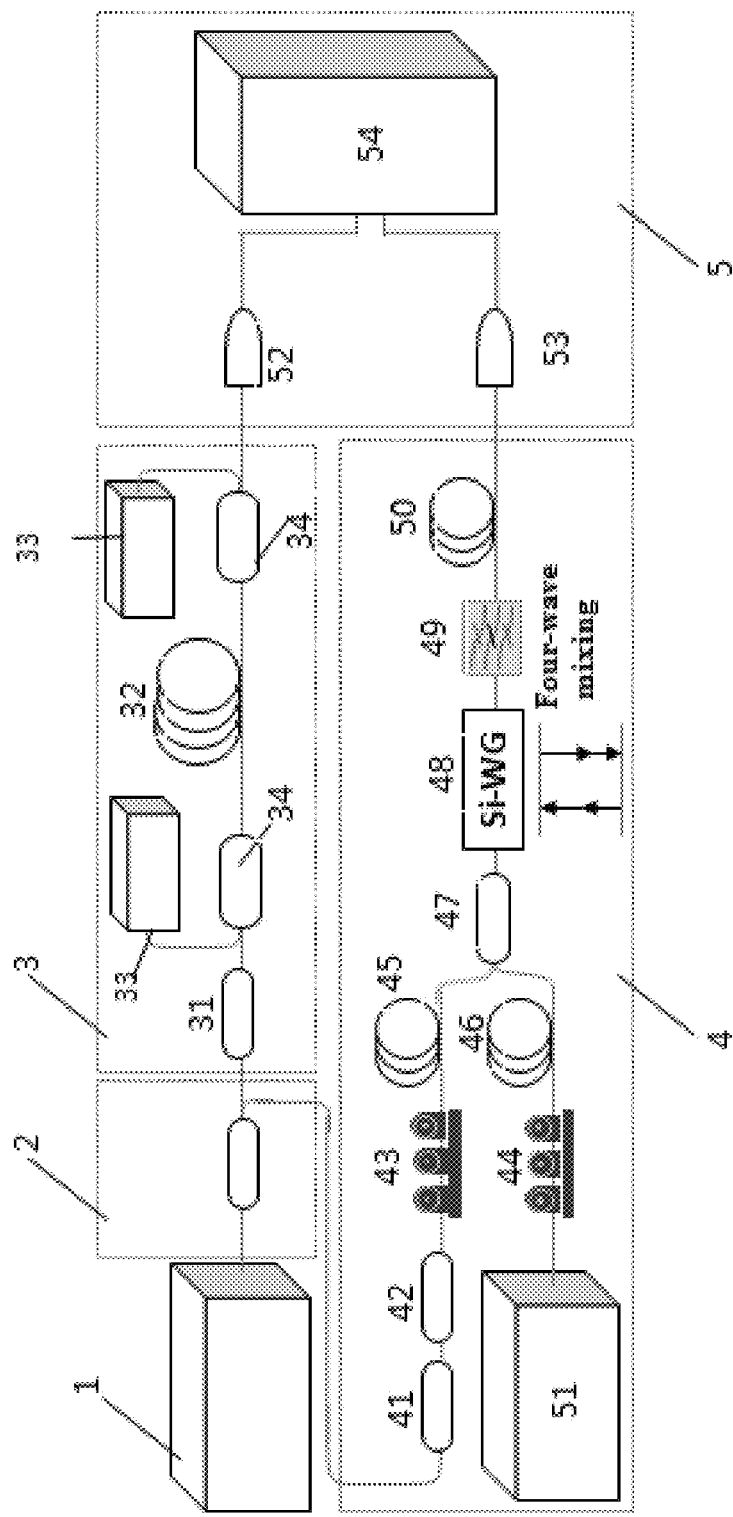
FIG. 3 is a structural schematic diagram of a device according to an embodiment II of the present disclosure.

Referring to FIGS. 1 and 2, the present embodiment provides a high-resolution real-time time-frequency domain measuring device for an ultra-short pulse based on a time lens and dispersion Fourier transform, including a light splitting unit for splitting signal light to be measured, a time lens unit used to perform time domain amplification on the signal light to be measured, a dispersion Fourier transform unit used to performing Fourier transform on the signal light to be measured, and a detection unit used to receive and detect measured data.

In the present embodiment, the light splitting unit is a light splitter 2 used to split the signal light to be measured into two beams: one serving as signal light for the time lens unit 4 and the other one serving as signal light for the dispersion Fourier transform unit 3. In other embodiments, light splitting components in other forms may also be adopted, as long as it may realize light splitting.

The time lens unit 4 includes a first attenuator 41 used to adjust the intensity of the signal light, a time delay line 42 used to adjust relative time delay between the signal light and pump light, a first dispersion medium 45 used to perform secondary phase modulation on the frequency domain of the signal light, a pump source 51 used to provide pump light for a four-wave mixing process, a second dispersion medium 46 used to perform the secondary phase modulation on the frequency domain of the pump light, a first polarization controller 43 and a second polarization controller 44 which are used to adjust the polarizations of the signal light and the pump light respectively, a beam combiner 47 used to combine the signal light with the pump light, a high-nonlinearity low-flattened-dispersion silicon-based micro-nano waveguide 48 used to generate a four-wave mixing effect, a filter 49 used to filter out the pump light, the signal light and the like to obtain idler light, and a third dispersion medium 50 used to perform the second-phase modulation on the frequency domain of the idler light.

In the present embodiment, the first attenuator 41, the time delay line 42, the first polarization controller 43 and the first dispersion medium 45 are arranged in sequence along a light path, and are located in one incident light path of the beam combiner 47. The pump source 51, the second polarization controller 44 and the second dispersion medium 46 are arranged in sequence along a light path, and are located in the other incident light path of the beam combiner 47. The high-nonlinearity low-flattened-dispersion silicon-based micro-nano waveguide 48, the filter 49 and the third dispersion medium 50 are arranged in sequence along a light path, and are located in an emergent light path of the beam combiner 47. The signal light to be measured that enters the time lens unit passes through the first attenuator 41, the time delay line 42, the first polarization controller 43 and the first dispersion medium 45 in sequence and then enters the beam combiner 47. The pump light passes through the second polarization controller 44 and the second dispersion medium 46 in sequence and then enters the beam combiner 47. The beam combiner 47 combines the signal light with the pump light. The combined light passes through the high-nonlinearity low-flattened-dispersion silicon-based micro-nano waveguide 48, the filter 49 and the third dispersion medium 50 in sequence and then obtained idler light is output to the detection unit 5.

The dispersion Fourier transform unit 3 includes a second attenuator 31 used to adjust the intensity of the signal light that enters the dispersion Fourier transform unit, and a fourth dispersion medium 32 for realizing dispersion Fourier transform. The fourth dispersion medium 32 is a dispersion-flattened dispersion medium having sufficiently large group velocity dispersion. In the present embodiment, the signal light that enters the dispersion Fourier transform unit is adjusted in power by the second attenuator 31, and then is output to the detection unit 5 after Fourier transform by the fourth dispersion medium 32.

The detection unit 5 includes photodetectors for receiving data, and a real-time oscilloscope. In the present embodiment, the detection unit 5 includes a first photodetector 52, a second photodetector 53 and a real-time oscilloscope 54. The input end of the first photodetector 52 is connected with the output end of the dispersion Fourier transform unit 3 to acquire frequency domain information of the signal light to be measured. The input end of the second photodetector 53 is connected with the output end of the time lens unit 4 to acquire time domain information of the signal light to be measured. The output ends of the first photodetector 52 and the second photodetector 53 are connected with the input end of the real-time oscilloscope 54. The first photodetector and the second photodetector are both photodetectors having GHz bandwidths, and the real-time oscilloscope is a real-time oscilloscope having a GHz bandwidth.

A high-resolution real-time time-frequency domain measuring method for an ultra-short pulse based on a time lens and dispersion Fourier transform is implemented by the following process, including the following steps that:

1) signal light to be measured is split into two beams by a light splitter: one serving as signal light for a time lens unit and the other one serving as signal light for a dispersion Fourier transform unit;

2) a pump source emits pump light; the intensity of the signal light that enters the time lens unit is adjusted by using a first attenuator to enable the signal light to satisfy an intensity condition of occurrence of four-wave mixing; relative time delay between the pump light and the signal light in the time lens unit is adjusted by using a time delay line; the polarization directions of the pump light and the signal light in the time lens unit are adjusted by using a second polarization controller and a first polarization controller respectively to enable the pump light and the signal light to satisfy phase matching conditions of occurrence of the four-wave mixing; secondary phase modulation is performed on the frequency domains of the pump light and the signal light by using a second dispersion medium and a first dispersion medium respectively; after the pump light and the signal light pass through a beam combiner, the obtained combined light is injected into a high-nonlinearity low-flattened-dispersion silicon-based micro-nano waveguide to generate a high-efficiency low-threshold four-wave mixing effect; after the combined light passes through a filter, idler light is obtained and then output, and the secondary phase modulation is performed on the frequency domain of the idler light by using a third dispersion medium, so as to realize high-fidelity high-multiplying-power time domain amplification of the signal light;

3) the intensity of the signal light that enters the dispersion Fourier transform unit is adjusted by using a second attenuator to enable the signal light to satisfy an intensity condition of occurrence of dispersion Fourier transform; frequency domain to time domain conversion of the signal light is realized by using the dispersion Fourier transform in a fourth dispersion medium;

4) time-frequency domain information of the signal light to be measured is recorded in real time by using a detection unit (including photodetectors and real-time oscilloscope which have GHz bandwidths), so as to realize the high-resolution real-time measurement of the time-frequency domains of the ultra-short pulse.

The present disclosure injects an ultra-short pulse to be measured into the high-resolution real-time time-frequency domain measuring device for an ultra-short pulse based on a time lens and dispersion Fourier transform, and uses the detection unit (including the photodetectors and the real-time oscilloscope which have the GHz bandwidths) to record the time-frequency domain information of the signal light to be measured, thereby realizing the high-resolution real-time measurement of the time-frequency domains of the ultra-short pulse.

The Working Principle of the Present Disclosure is as Follows:

Firstly, the ultra-short pulse to be measured is split into two beams: one serving as the signal light for the time lens unit, and the other one serving as the signal light for the dispersion Fourier transform unit;

in the time lens unit, the polarization directions of the pump light and the signal light are adjusted by using the two polarization controllers respectively to enable the pump light and the signal light to satisfy the phase matching conditions of occurrence of the four-wave mixing; the relative time delay between the pump light and the signal light is adjusted by using the time delay line to cause the signal light and the pump light to be synchronized in time; the intensity of the signal light is adjusted by using the attenuator to enable the signal light to satisfy the intensity condition of occurrence of the four-wave mixing; the secondary phase modulation is performed on the frequency domains of the pump light and the signal light respectively by using the dispersion mediums (namely linear chirp introduced to the pump light and input dispersion serving for a time lens system); after the pump light and the signal light pass through the beam combiner, the obtained combined light is injected into the silicon-based micro-nano waveguide to generate the high-efficiency low-threshold four-wave mixing effect; after the combined light passes through the filter, the idler light is obtained and then output, and the secondary phase modulation (output dispersion serving for a time lens system) is performed on the frequency domain of the idler light by using the dispersion medium, so as to realize the high-fidelity high-multiplying-power time domain amplification of the signal light;

in the dispersion Fourier transform unit, the power of the signal light is adjusted by using the attenuator to enable the signal light to satisfy the intensity condition of occurrence of the dispersion Fourier transform; the frequency domain to time domain conversion of the signal light is realized by using the dispersion Fourier transform in the dispersion-flattened dispersion medium having the sufficiently large group velocity dispersion to convert the information of the signal light from frequency domain to the time domain; and the time-frequency domain information of the signal light to be measured is recorded in real time by using the detection unit (including the photodetectors and the real-time oscil-loscope which have the GHz bandwidths), thereby realizing the high-resolution real-time measurement of the time-frequency domains of the ultra-short pulse.

Figure 4A:
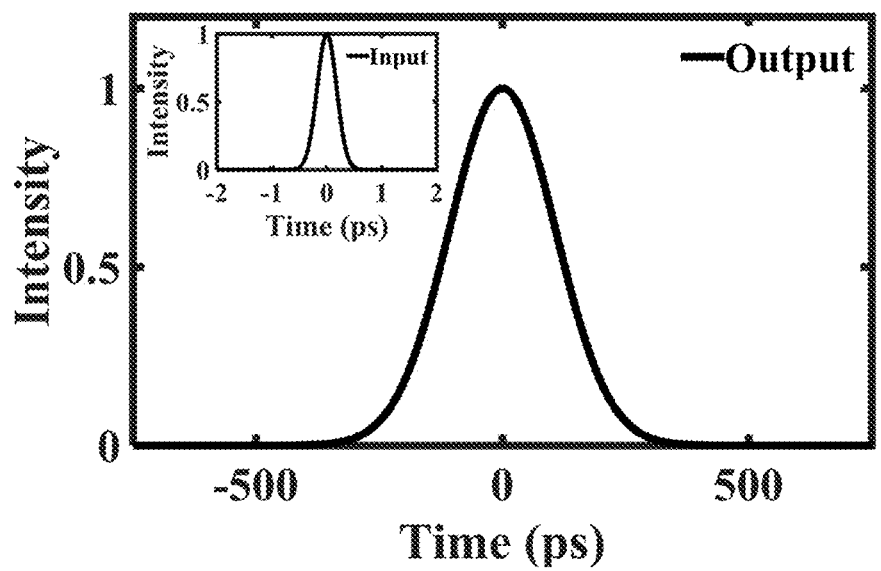
FIG. 4a is a time domain amplification result diagram of the present disclosure.
Figure 4B:
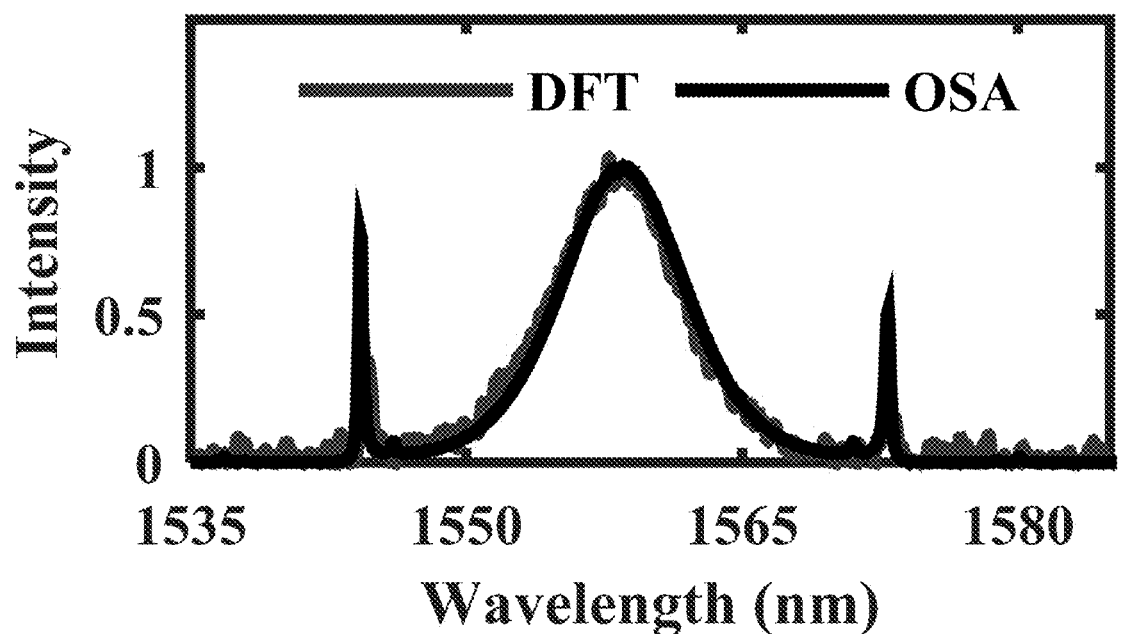
FIG. 4b is a dispersion Fourier transform result diagram (OSA: optical spectrum analyzers; DFT: dispersion Fourier transform).

Referring to FIGS. 4a and 4b, time domain amplification and Fourier transform results are illustrated. The high-fidelity high-multiplying-power time domain amplification of the ultra-short pulse can be realized by using the time lens, and the frequency domain to time domain conversion of the ultra-short pulse can be realized by using the dispersion Fourier transform. Therefore, the adoption of the time lens and the dispersion Fourier transform method may realize high-fidelity time domain amplification more than 500 times and Fourier transform, thus realizing the high-resolution real-time measurement of the time-frequency domains of the ultra-short pulse by using the oscilloscope and the photodetectors which have the GHz bandwidth. The present disclosure constructs the time lens unit based on the high-efficiency low-threshold four-wave mixing effect in the silicon-based micro-nano waveguide and constructs the dispersion Fourier transform unit based on the dispersion-flattened dispersion mediums (the dispersion mediums may be dispersion compensation fibers or chirped Bragg gratings) having the sufficiently large group velocity dispersion to realize the high-multiplying-power high-fidelity time domain amplification and the Fourier transform of the ultra-short pulse, and records the time-frequency domain information of the signal light to be measured by using the detection unit (including the photodetectors and the real-time oscilloscope which have the GHz bandwidths), thereby realizing the high-resolution real-time measurement of the time-frequency domains of the ultra-short pulse.

Embodiment II

The difference of the present embodiment from Embodiment I is that the dispersion Fourier transform unit of the present embodiment also includes the Raman pump source 33 used to amplify a signal, and the wavelength division multiplexer 34. When a signal to be measured that enters the dispersion Fourier transform unit is relatively weak, the signal to be measured is amplified.

The invention claimed is:

1. A high-resolution real-time time-frequency domain measuring device for an ultra-short pulse, comprising: a light splitting unit, a time lens unit, a dispersion Fourier transform unit, and a detection unit,
   wherein, during operation,
   the light splitting unit splits signal light to be measured a first beam serving as signal light for the time lens unit and a second beam serving as signal light for the dispersion Fourier transform unit,
   the time lens unit performs time domain amplification on the received signal light to be measured,
   the dispersion Fourier transform unit performs Fourier transform on the received signal light to be measured, and realizes frequency domain to time domain conversion of the signal light to be measured,
   the detection unit receives and records time domain information of the signal light to be measured processed by the time lens unit and frequency domain information of the signal light to be measured processed by the dispersion Fourier transform unit,
   wherein the time lens unit comprises a beam combiner, a signal light path and a pump light path respectively located in two incident light paths of the beam combiner, and an idler light path located in an emergent light path of the beam combiner, the signal light path comprises a first attenuator, a first polarization controller, and a first dispersion medium that are arranged in sequence along the signal light path, the pump light path comprises a pump source, a second polarization controller, and a second dispersion medium that are arranged in sequence along the pump light path, the idler light path comprises a silicon-based micro-nano waveguide, a filter, and a third dispersion medium that are arranged in sequence along the idler light path, and, during operation, the first attenuator adjusts the intensity of the signal light, the first polarization controller adjusts the polarization of the signal light, the first dispersion medium performs secondary phase modulation on the frequency domain of the signal light, the pump source provides pump light for a four-wave mixing process, the second polarization controller adjusts the polarization of the pump light, the second dispersion medium performs the secondary phase modulation on the frequency domain of the pump light, the beam combiner combines the signal light with the pump light, the silicon-based micro-nano waveguide generates a four-wave mixing effect, the filter filters out the pump light and the signal light to obtain idler light, and the third dispersion medium performs the secondary phase modulation on the frequency domain of the idler light.

2. The high-resolution real-time time-frequency domain measuring device for the ultra-short pulse according to claim 1, wherein the time lens unit further comprises a time delay line located in the signal light path or the pump light path and, during operation, adjusts the signal light and the pump light to be simultaneously incident to the beam combiner.

3. The high-resolution real-time time-frequency domain measuring device for the ultra-short pulse according to claim 1, wherein the dispersion Fourier transform unit comprises a second attenuator and a fourth dispersion medium, during operation, the second attenuator adjusts the intensity of the signal light entering the dispersion Fourier transform unit, and the fourth dispersion medium performs Fourier transform on the signal light.

4. The high-resolution real-time time-frequency domain measuring device for the ultra-short pulse according to claim 3, wherein the detection unit comprises a real-time oscilloscope and two photodetectors; input ends of the two photodetectors are respectively connected with output ends of the dispersion Fourier transform unit and the time lens unit, and the output ends of the two photodetectors are connected with the real-time oscilloscope.

5. The high-resolution real-time time-frequency domain measuring device for the ultra-short pulse according to claim 4, wherein the photodetectors are photodetectors with a GHz bandwidth, the real-time oscilloscope is a real-time oscilloscope with a GHz bandwidth, and the light splitting unit is a light splitter.

6. The high-resolution real-time time-frequency domain measuring device for the ultra-short pulse according to claim 5, wherein the first dispersion medium, the second dispersion medium, and the third dispersion medium are single mode fibers or dispersion compensation fibers, and the fourth dispersion medium is a dispersion compensation fiber and a chirped Bragg grating.

7. The high-resolution real-time time-frequency domain measuring device for the ultra-short pulse according to claim 6, wherein the dispersion Fourier transform unit further comprises the Raman pump source configured to amplify the signal light and a wavelength division multiplexer.

8. A high-resolution real-time time-frequency domain measuring method for an ultra-short pulse, comprising:

Step I, splitting signal light to be measured a first beam serving as signal light for a time lens unit and a second beam serving as signal light for a dispersion Fourier transform unit;

Step II, performing time domain amplification on the signal light incident to the time lens unit by using the time lens unit;

Step III, performing frequency domain to time domain conversion on the signal light incident to the dispersion Fourier transform unit by using the dispersion Fourier transform unit; and Step IV, receiving and recording frequency domain information of the signal light to be measured processed by the dispersion Fourier transform unit and time domain information of the signal light to be measured processed by the time lens unit by using a detection unit, wherein, Step II comprises:

adjusting the power of the signal light by using a first attenuator to enable the signal light to satisfy an intensity condition of occurrence of four-wave mixing;

adjusting the polarization directions of the signal light and the pump light by using a first polarization controller and a second polarization controller respectively to enable the signal light and the pump light to satisfy phase matching conditions of occurrence of the four-wave mixing; adjusting relative time delay between the pump light and the signal light by using a time delay line; performing secondary phase modulation on the frequency domains of the signal light and the pump light by using a first dispersion medium and a second dispersion medium respectively;

after the signal light and the pump light which are subjected to the secondary phase modulation are combined by a beam combiner, injecting the obtained combined light into a silicon-based micro-nano waveguide, so as to generate a high-efficiency low-threshold four-wave mixing effect; and after the combined light is filtered by a filter, outputting idler light, and performing the secondary phase modulation on the frequency domain of the idler light by using a third dispersion medium, so as to realize the time domain amplification of the signal light.

9. The high-resolution real-time time-frequency domain measuring method for the ultra-short pulse according to claim 8, wherein Step III comprises:

adjusting the power of the signal light by using a second attenuator to enable the signal light to satisfy an intensity condition of occurrence of dispersion Fourier transform; and realizing the frequency domain to time domain conversion of the signal light by using dispersion Fourier transform in a fourth dispersion medium.

* * * * *